US006538597B1

United States Patent
Steudel (12)

(10) Patent No.: US 6,538,597 B1
(45) Date of Patent: Mar. 25, 2003

(54) RADAR SYSTEM HAVING SPOOFER, BLANKER AND CANCELER

(75) Inventor: Fritz Steudel, Sudbury, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/503,267

(22) Filed: Feb. 14, 2000

Related U.S. Application Data
(60) Provisional application No. 60/120,280, filed on Feb. 16, 1999.

(51) Int. Cl.[7] ................................................. G01S 7/36
(52) U.S. Cl. ............................ 342/17; 342/13; 342/16; 342/89; 342/149; 342/159; 342/160; 342/195; 342/378; 342/379; 342/380; 342/383
(58) Field of Search .............................. 342/13–20, 89, 342/159, 175, 189, 192–197, 378–384, 149–158, 160–164, 90–103

(56) References Cited

U.S. PATENT DOCUMENTS

| | | | | |
|---|---|---|---|---|
| 3,943,511 A | * | 3/1976 | Evans et al. .................. | 342/94 |
| 4,298,872 A | * | 11/1981 | Rodgers ...................... | 342/380 |
| 4,616,232 A | * | 10/1986 | Reits .......................... | 342/379 |
| 4,959,653 A | | 9/1990 | Ganz | |
| 5,245,347 A | | 9/1993 | Bonta et al. | |
| 5,307,069 A | * | 4/1994 | Evans .......................... | 342/19 |
| 5,365,234 A | | 11/1994 | Lewis | |
| 5,442,365 A | | 8/1995 | Lewis et al. | |
| 5,502,448 A | | 3/1996 | Cantrell et al. | |
| 5,539,407 A | * | 7/1996 | Scholz ......................... | 342/17 |
| 5,600,326 A | | 2/1997 | Yu et al. | |
| 6,100,844 A | * | 8/2000 | Whiting et al. ............. | 342/379 |

FOREIGN PATENT DOCUMENTS

| | | | | |
|---|---|---|---|---|
| EP | 0173360 A1 | * | 3/1986 | ............. G01S/7/28 |
| EP | 0654678 A1 | * | 5/1995 | ............. G01S/7/28 |
| GB | 2259209 A | * | 3/1993 | ............. G01S/7/36 |
| WO | WO-9534828 A1 | * | 12/1995 | ............. G01S/7/28 |

OTHER PUBLICATIONS

Lee et al., "An Open–Loop Nulling Algorithm For Optimal Nulling Resolution With A MBA Anti–Jam Antenna" International Symposium on Antennas and Propagation, U.S. New York, IEEE, pp. 1670–1673, (Jun. 26, 1999).

Weber et al., "ECCM Signal Processor for Space–Based Radar", Record of the 1993 IEEE National Radar Conference, pp. 245–249, (Apr. 1993).

International Search Report dated 20/18/00 PCT/US00/03762.

* cited by examiner

Primary Examiner—Bernarr E. Gregory
(74) Attorney, Agent, or Firm—Daly, Crowley & Mofford, LLP

(57) ABSTRACT

A radar system including a blanker and a sidelobe canceler is described including an open loop nulling circuit for introducing one or more nulls in the main beam and a blanker beam. With this arrangement, the blanker can be operated even in the presence of strong sidelobe jamming without the conventional problems attributable to noise amplification. Also described is an antenna configuration for implementing the open loop nulling, including a pair of orthogonal linear arrays. One of the arrays is omnidirectional in azimuth and directional in elevation and the other array is omnidirectional in elevation and directional in azimuth in order to point the main and blanker beams in the direction of jammers. In one embodiment, the radar system further includes a spoofer and the crossed linear arrays process the spoofer signals on transmit and process blanker signals on receive.

17 Claims, 4 Drawing Sheets

RADAR SYSTEM HAVING SPOOFER, BLANKER AND CANCELER

CROSS-REFERENCE TO RELATED APPLICATIONS

This application claims priority under 35 U.S.C. §119(e) from U.S. provisional application No. 60/120,280 filed on Feb. 16, 1999.

STATEMENTS REGARDING FEDERALLY SPONSORED RESEARCH

Not applicable.

FIELD OF THE INVENTION

The invention relates to apparatus and techniques for providing a phased array radar system having a blanker for reducing the effects of sidelobe interference which is capable of effective operation even in the presence of strong sidelobe jamming.

BACKGROUND OF THE INVENTION

As is known in the field of radar systems, jamming is a technique used to interfere electronically with an enemy radar system. The jammer generates and transmits radar signals which are designed to saturate or otherwise effectively disable the enemy radar receiver.

Jammers may generate jamming signals based on knowledge of typical radar operating bands of frequencies of the system to be jammed. The jammer signal may be transmitted over a limited frequency interval based on knowledge or an estimate of the instantaneous frequency of the jammed radar system (this technique is sometimes referred to as repeater jamming). Smart jammers have the capability to determine the frequency of the transmitted radar signals and focus the jamming energy over a narrow band at the determined frequency (this technique is sometimes referred to as spot jamming). Another type of jamming is referred to as barrage jamming in which jamming signals are radiated over a wide band of frequencies Various techniques are utilized to counteract the effects of interference signals, including jammer signals, in sidelobes of the main, or sum beam. One such technique is referred to as sidelobe canceling, in which the main beam sidelobes are minimized and preferably, nulled. Sidelobe cancelers can also be used to provide a null in a main beam sidelobe in the direction of the jammer. To this end, auxiliary antenna(s) (typically one antenna element per jammer) receive and process jammer signals in order to determine weights necessary for the auxiliary antenna outputs to be added to the main beam in order to provide a null in the sidelobes at the jammer direction.

Preferably, auxiliary antennas used for side lobe cancellation have a relatively wide field of view, as may be provided by an omnidirectional, or isotropic antenna. However, such antennas have relatively low gain such as on the order of 6 dB, requiring significant gain to be introduced in order to effectively null the sidelobes in the direction of the jammer. Consider for example, a main beam pattern in which the peak sidelobe has a gain of +20 dBi, and (which corresponds to the rms error sidelobe level of a well designed antenna array). For a jammer in a −15 dBi sidelobe, the auxiliary channel is attenuated by +6−(−15)=21 dB. However, a jammer in a +20 dBi sidelobe requires 14 dB amplification of the auxiliary channel (20 dBi=+6+14). The introduction of such gain on the auxiliary channels amplifies thermal noise, which couples into the main beam, thereby degrading, the sensitivity of the main beam. Furthermore, nulling one sidelobe tends to increase sidelobes in other directions. Even with these drawbacks, however, the sidelobe canceler can be an effective way of counteracting the effects of sidelobe jamming.

Blanking is another technique used to reduce the effects of sidelobe interference. A blanker utilizes a dedicated receive antenna and processing channel, with the signal processing being matched to the main beam processing. The gain of the blanking channel is greater than that of the main beam sidelobes. The outputs of the main beam processor and the blanker processor are compared in order to determine whether main beam target detections are valid. More particularly, if sidelobe interference is strong, then the signal strength in the blanker channel will be stronger than in the main beam channel and the main beam output is rejected. Alternatively, if the signal strength in the main beam channel is greater than that in the blanker channel, then main beam target detections are considered valid. Interference signals blanked in this manner include strong sidelobe clutter, larger aircraft, repeater jammers, or jammers which radiate radar signals like chirp signals.

However, one problem with blankers is the requirement that its antenna gain be greater than the sidelobe gain. As with the sidelobe canceler, the output signal of the blanker must be amplified to blank a sidelobe having more dBi gain than does the blanker. With such high amplifier gain, system noise levels are amplified which results in degradation of main beam sensitivity. Furthermore, in the event that the blanker antenna is spaced from the main beam aperture, multipath reflections can reduce the strength of incoming signals in the blanker while increasing them in the main beam, thereby negatively affecting blanker performance. As a result of these drawbacks, blankers are sometimes disabled in the presence of strong sidelobe jamming.

Because blankers and sidelobe cancelers are useful to reduce the effects of different kinds of jamming, and also because each is not without its problems, particularly the exacerbation of noise, generally one such technique will be operated at a time. That is, in the presence of sidelobe jamming, the canceler is used to introduce a null in the direction of the jammer and the blanker is turned off; whereas, in the presence of repeater jamming, the blanker is used and the canceler is turned off.

An additional feature of some radar systems is a spoofer used to reduce the effectiveness of smart jammers. Smart jammers are capable of listening to a transmitted radar signal to deduce its frequency and then focusing the jamming energy to a fraction of the radar band at the deduced frequency. A spoofer includes a waveform generator which generates a spoofer signal capable of confusing a smart sidelobe jammer so as to prevent the jammer from ascertaining the frequency of the actual radar signals. That is, the spoofer signal is selected to camouflage the actual radar signal. This may be achieved in various ways, such as by transmitting a noise-like signal or by transmitting a replica of a radar signal. As one example, the spoofer signal may be a swept sinewave having an amplitude greater than the amplitude of the actual radar signal over the entire frequency range of operation. While it is desirable that the spoofer antenna be nearly omnidirectional, it is also desirable that the spoofer power be relatively low.

Spoofers typically utilize a separate transmit antenna spaced from the main transmit antenna. This is because antiradiation missiles can lock on "active decoys" which are radar signals radiated in frequencies surrounding the frequency of the actual radar signal. If the spoofer antenna were integral to the main transmit antenna, its use could cause an antiradiation missile to lock onto the radar system.

SUMMARY OF THE INVENTION

In accordance with the present invention, a radar system includes an antenna for receiving radar signals, said antenna including a main antenna having a main beam pattern and a blanker antenna having a blanker beam pattern and a beam forming network including a nulling circuit, said beam forming network being coupled to said main antenna for forming a sum beam having a null in the direction of a jammer and for forming a blanker beam having a null in the direction of the jammer. The radar system further includes a first signal processor for processing radar signals received in said sum beam; a second signal processor for processing radar signals received in said blanker beam; and a comparison circuit for comparing the level of signals received in said sum beam with the level of signals received in said blanker beam in order to determine when radar signals received in said main beam are representative of a valid target. With such an arrangement, a radar system can operate in the presence of strong sidelobe jamming without the conventional problems attributable to noise amplification.

In accordance with another feature of the present invention, the radar system further includes an open loop ECM nulling map circuit coupled to said beam forming network for detecting the direction of the jammer, wherein the nulling circuit is responsive to the detected jammer direction by providing a null in the sum beam pattern and in the blanker beam pattern. The radar system also includes a plurality of auxiliary antennas and a sidelobe canceler coupled to said plurality of axiliary antennas. With such an arrangement, certain drawbacks of the sidelobe canceler are overcome with the sidelobe canceler providing additional jamming rejection. More specifically, with the open loop nulling, the sidelobe auxiliary antennas, will have more gain in the jamming direction than the main beam, rather than less gain as would be the case in absence of open loop nulling in the jammer direction.

This is achieved with the use of an open loop nulling circuit for introducing one or more nulls into the blanker and main beam patterns in the direction of the jammers. The main beam patterns include a sum beam (beams) and difference channels, such as $\Delta Az$, $\Delta El$, and $\Delta\Delta$. That is, whereas, conventional blankers were disabled in the presence of strong jamming in order to prevent excessive noise from being coupled into the main beam, by minimizing the sensitivity of the blanker channel to sidelobe jammer signals, the blanker can be kept on in the presence of strong sidelobe jamming. Stated differently, by providing the blanker with nulls in the jammer directions but with high gain elsewhere, the effectiveness of the blanker as to sidelobe interference and barrage jamming is maintained while reducing its sensitivity and thus also the noise issues associated with blanker operation in the presence of jamming.

Furthermore, with this arrangement, omnidirectional sidelobe canceler antenna(s) can be used without the conventional problems associated with canceler operation in the presence of strong sidelobe jamming. That is, whereas it has heretofore been necessary to introduce significant gain into the canceler channels in order to effectively cancel the sidelobes in the presence of strong jamming, since the sidelobes are already reduced by the open loop nulling in the main and blanker beams, the canceler gain necessary to further reduce the effect of the jamming signals and to cancel the sidelobes is reduced. Stated differently, by introducing nulls into the main and blanker beams, the work of the sidelobe canceler is made easier (i.e., less gain is required), thereby reducing the problems associated with noise amplification. Thus, the effectiveness of the canceler as to sidelobe jamming is maintained, but without the conventional noise problems associated with canceler operation in the presence of sidelobe jamming.

In accordance with another feature of the present invention, the radar system includes an antenna having a pair of linear arrays disposed orthogonal with respect to one another. With such an arrangement, one of the linear arrays provides full azimuth coverage (i.e., is omnidirectional in azimuth) but limited elevation coverage, such as on the order of 10 degrees. The second linear array is omnidirectional in elevation with adaptive gain in azimuth in order to point beams in the direction of the jammers. The difference beam generated by subtracting signals received by the second linear array from signals received by the first linear array provides a composite beam that is omnidirectional in azimuth and has nulls in the direction of the jammers.

With this arrangement, the blanker beam has −15 dBi nulls in the direction of the jammers and thus, is able to operate even in the presence of strong sidelobe jamming. Further, the canceler auxiliary antennas have 21 dB more gain in the jamming directions than the blanker beam, instead of 14 dB less (for a 20 dBi sidelobe in the jammer direction).

In one embodiment in which the radar system farther comprises a spoofer, the first linear array provides the blanker antenna on receive and the spoofer antenna on transmit. Use of the null(s) in the antenna beam patterns advantageously reduces the power associated with the spoofer, since the power required of the spoofer is less in a −15 dBi main beam than for a +20 dBi sidelobe. Further, the nulling permits the spoofer antenna to be integral with the main beam aperture without adding significant risk of antiradiation seekers locking onto the spoofer signals.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
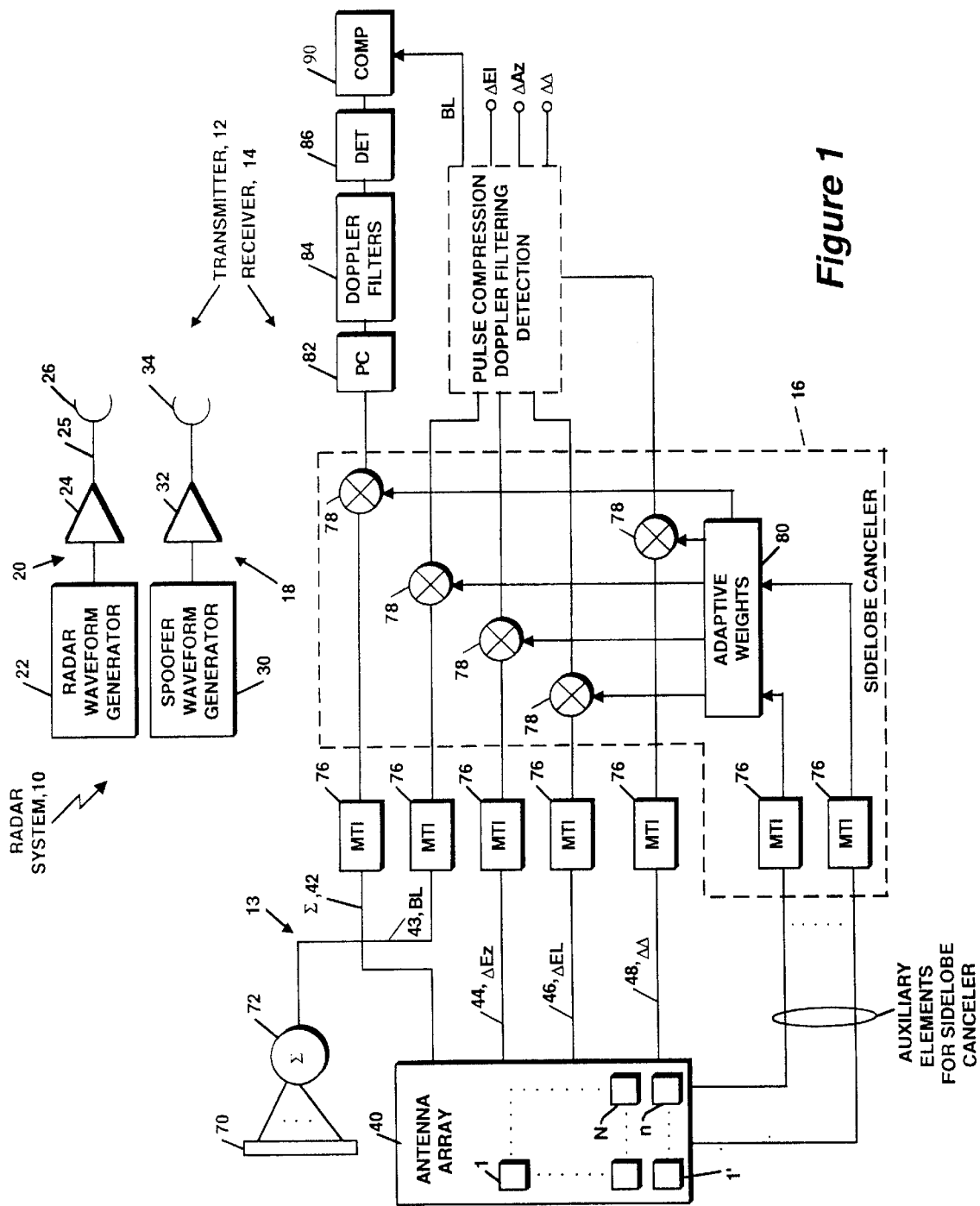
FIG. 1 shows a radar system including a blanker, a sidelobe canceler and a spoofer.

Before departing on a detailed description of the invention, it may helpful to review the concept for spoofing, blanking, and sidelobe cancellation which overcomes several limitations of traditional blanking and cancellation methods.

A spoofer typically radiates signals in the direction of jammers so that smart sidelobe jammers cannot deduce the radar frequency and spot jam, thereby increasing the jammer ERP by the ratio of barrage jamming bandwidth to the spot jamming bandwidth. For sophisticated jammers employing DRFM's (digital RF memory) the spot jamming could be as narrow as the radar search bandwidth, and the ratio of jamming bandwidth to signal bandwidth as high as 30 dB. The waveform of a spoofer should contain multiple signals, each with the envelope and phase modulation of the radar signal, and dispersed across the total operating band in the frequency slots or bands assigned to the radar, with the spoofer signal seen by the jammer higher than the radar signal in the sidelobes.

A blanker channel typically provides the same signal processing matched filter as for the main beam channel. Its input is from an antenna which has more gain than the sidelobes of the main beam in the angle of the region likely to cause interference signals. A comparison between channels at the output of the processor rejects detections in the main beam channel if the signal in the sidelobe channel is stronger. Signals blanked in this process include strong sidelobe clutter, larger aircraft, repeater jammers, or jammers which radiate radar like chirp signals. A major problem with sidelobe blankers is the inability to achieve adequate gain relative to the main beam sidelobes, so as to minimize noise in the blanker channel from degrading main beam performance. These problems are exacerbated when the sidelobe blanker phase center is displaced from that of the main beam, because multipath reflections can reduce incoming signals in the blanker while increasing them in the main beam.

Sidelobe cancellation typically requires at least one auxiliary channel per jammer. The auxiliary channel antenna should, like the blanker, have more gain than the main beam sidelobe in the direction of the jammer. Typically, near omni-directional antennas are used for the auxiliary antennas however the amplification required to provide a strong enough signal has two deleterious effects. First, the noise from the sidelobe canceller (SLC) adds to the main beam, degrading sensitivity and, secondly, sidelobes in other directions increase.

The solution to these problems shall now be described in the context of a solid-state module phased array radar. We will discuss an example, to illustrate the concept, of an antenna with an N=10,000 element array at X-band. Elements are assumed to have a cosine gain dependence on scan angle, so the broadside element gain is $$G_e = 4 = 4\pi \frac{A_e}{\lambda^2} \qquad \text{Eq. 1}$$

For λ=0.03 m, $$A_e = \frac{\lambda^2}{\pi} = 3 \times 10^{-4} \text{ m}^2 \text{ per element,}$$

3 m² for the total aperture. Elements are assumed calibrated to a phase error of 4° rms so that the rms sidelobe level is $$\upsilon^2 = \sigma_\theta^2 + \sigma_\alpha^2 = 1.5\sigma_\theta^2 = 1.5 \times \sin^2 4 = -21 \text{ dBe} = -15 \text{ dBi.} \qquad \text{Eq. 2}$$

where $\upsilon^2$=fraction of power redirected into the sidelobes;

$\sigma_\theta$=rms radar phase error; and $\sigma_\alpha$=rms fractional amplitude error.

Thus, using an electronic countermeasures (ECM) map, nulls can be placed in the direction of jammers with an error limited floor of −15 dBi, equivalent to a sidelobe level of 10 log (4N)+15=61 dB below the main beam. It would result in excessively high loss to obtain these sidelobe levels with traditional weighting. Open loop nulling achieves the benefit of low sidelobes in the jammer direction without the heavy weighting loss.

Sidelobe cancelers make up the additional jamming rejection. A single element having 6 dB gain will produce +6 dBi−(−15 dBi)=21 dB more signal strength than the main beam. The attenuation (provided digitally in the signal processor) applied to the auxiliary channel will permit cancellation with less than 1 dB noise carryover loss. Also, with open loop nulling, the cancellation required is typically 20 dB less than for conventional systems, making the canceler system less susceptible to phase and amplitude unbalance between main and auxiliary channels.

The phased array radars to date have traditionally combined quadrant symmetric elements or subarrays to form sum Σ, azimuth ΔAz, and elevation (ΔEl) beams. As shown below, there is also a ΔΔ output which is shown to be the product of the ΔAz and the ΔEl channels. This fourth channel provides an additional degree of freedom so that the array can null a main beam jammer and still provide normalized azimuth and elevation channels. The relationships $$\frac{\Delta El}{\Sigma} = \frac{\Delta\Delta}{\Delta Az} \text{ and } \frac{\Delta Az}{\Sigma} = \frac{\Delta\Delta}{\Delta El} \qquad \text{Eq. 3}$$

show that the normalized monopulse estimate is obtained from two beams (ΔΔ and ΔAz or ΔΔ and ΔEl), both of which can be pointed at the jammer to null the jammer while producing an off-null target response. The modified angle channels (ΔEl', ΔAz', and ΔΔ') adapt the weights multiplying the sum channel to produce the closed loop null.

An architecture for spoofing, blanking and jammer cancellation is described above. Extending the architecture to include a single main beam jammer means that the number of omni-directional auxiliary elements required for canceling n jammer can be augmented by the Δ—Δ channel with the ΔΔ channel being used to cancel one jammer, whether it is in the sidelobes or in the main beam.

It has been pointed out that the jammer nulling must be carried out as a single process; e.g., it is not possible to carry out sidelobe cancellation and mainlobe cancellation as sequential operations, since all jammers appear in all the reference elements. This is probably because, typically, the concern has been about sidelobe jammers or main beam jammers, but not both threats simultaneously.

If we have a four quadrant antenna beam, with the upper left quadrant being quadrant A, the upper right quadrant being quadrant B, the lower left quadrant being quadrant C and the lower right quadrant being quadrant D and letting v represent the elevation axis and u represent the azimuth axis, then:

$$\begin{cases} A = e^{jk(\alpha+\beta)} \\ B = e^{jk(-\alpha+\beta)} \\ C = e^{jk(\alpha-\beta)} \\ D = e^{jk(-\alpha-\beta)} \end{cases} \quad \text{Eq. 4}$$

$\alpha, \beta$ are element phase commands in $u$ and $v$ to steer beam; and $$\Sigma = \frac{1}{4}(A+B+C+D) = \quad \text{Eq. 5}$$

$$\frac{e^{jk\beta}}{4}[e^{jk\alpha}+e^{-jk\alpha}] + \frac{e^{-jk\beta}}{4}[e^{jk\alpha}+e^{-jk\alpha}] = \cos k\alpha \cos k\beta$$

$$\Delta El = \frac{1}{4}[A+B-(C+D)] = \quad \text{Eq. 6}$$

$$\frac{e^{jk\beta}}{4}[e^{jk\alpha}+e^{-jk\alpha}] - \frac{e^{-jk\beta}}{4}[e^{jk\alpha}+e^{-jk\alpha}] = \cos k\alpha \sin k\beta$$

$$\Delta Az = \frac{1}{4}[A+C-(B+D)] = \quad \text{Eq. 7}$$

$$\frac{e^{jk\alpha}}{4}[e^{jk\beta}+e^{-jk\beta}] - \frac{e^{-jk\alpha}}{4}[e^{-jk\beta}+e^{jk\beta}] = \sin k\alpha \cos k\beta$$

$$\Delta\Delta = \frac{1}{4}[A+D-(B+C)] = \frac{1}{4}[(A-C)-(D-B)] = \quad \text{Eq. 8}$$

$$\frac{e^{jk\alpha}}{4}[e^{jk\beta}-e^{-jk\beta}] - \frac{e^{-jk\alpha}}{4}[e^{jk\beta}-e^{-jk\beta}] = \sin k\alpha \sin k\beta$$

$$\frac{\Delta El}{\Sigma} = \frac{\sin k\beta}{\cos k\beta} = \frac{\Delta\Delta}{\Delta Az} \quad \text{Eq. 9}$$

$$\frac{\Delta Az}{\Sigma} = \frac{\sin k\alpha}{\cos k\alpha} = \frac{\Delta\Delta}{\Delta El} \quad \text{Eq. 10}$$

Note:

$$\Delta\Delta = \Delta Az \times \Delta El \quad \text{Eq. 11}$$

With main beam jamming, form:

$$\Delta El' \Delta El - c_{el}\Sigma \quad \text{Eq. 12}$$

$$\Delta Az' = \Delta Az - c_{az}\Sigma \quad \text{Eq. 13}$$

$$\Delta\Delta' = \Delta\Delta - c_{\Delta\Delta}\Sigma \quad \text{Eq. 14}$$

It should be appreciated that some of the limitations of conventional sidelobe cancelers/blankers include wide field of view coverage for auxiliaries, which leads to low gain auxiliary antenna designs resulting in high carry-over noise in sidelobe cancelers, loss of sensitivity in sidelobe blanker (SLB) and vulnerability to multipath lobing in a sidelobe canceler/sidelobe blanker (SLC/SLB). In blanker operation, the blanker channel has a separate receiver/signal processor matched filter and the target declaration requires the output channel signal exceed the blanker channel output. Another major problem is providing enough gain in the auxiliary antenna to avoid SNR loss and multipath loss. A blanker can be a separate (fourth) channel in addition to the $\Sigma$ channel, there channel and the $\beta$ channel. If the system uses sidelobe canceling, all four channels ideally should have a canceler and some blankers only work in the absence of jamming. In a spoofer operation, a spoofer radiates noise-like or radar waveform replica-like signals dispersed across the band. In the absence of spoofer, a smart jammer can listen to radar signal and jam a fractions of the radar band, increasing J/N by up to 20–30 dB. Typically, short range radars have long dwells and long range radars have targets beyond jammer range. The objective is to have a spoofer, signal seen by a smart jammer larger than a signal from radar transmit sidelobes by a ratio of total bandwidth to search signal bandwidth of up to 30 dB. In sidelobe canceler operation, the sidelobe cancellation requires at least one auxiliary element per jammer. Like a SLB, SLC auxiliary antenna should cover the field of view of expected jammers, yet have high gain. Using near omni-directional antennas, limitations include noise from SLC which adds to the main beam signal and also sidelobes in other directions increase.

To over come the latter, a system concept of operation for a solid state phased array radar includes an ECM map that locates jammers. Open loop receive weights (using phase/amplitude. module settings) place nulls in jammer directions (limited by errors to –15 dBi). Single element omni element antennas provide 6 dB gain for an auxiliary antenna. Gain of SLC to signal channel is +15–(–6)=21 dB which minimizes carryover noise. It has been observed that cancellation requirements are typically 20 dB less than for conventional system and are less sensitive to multipath.

An antenna for use with the contemplated system includes a vertical linear array to provide a Beam A, the vertical linear array being phased to provide high gain near horizon for high power jammers, but which can be tapered to include moderate gain for higher elevation, lower powered jammers. The antenna further includes a horizontal linear array that provides a Beam B, the horizontal linear beam being omni in elevation, but points beams in direction of the jammers. A differencing (Beam. A minus Beam B) output beam is also provided which has uniform gain in azimuth (for SLB function) and has –5 dBi nulls in the jammer directions (for SLC function). The beam A also serves as a spoofer beam on transmit. Important features of the latter includes minimizing SLC sensitivity loss, reducing multipath effects on blanker and SLC, avoids increasing sidelobes with SLC in other than the jammer direction, preserves simultaneous operation of SLB and SLC functions and provides a low power spoofer capability for defeating smart (DRFM) jammers.

Referring now to FIG. 1, a radar system 10 includes a receiver 14 having a blanker channel 13 and a sidelobe canceler 16 and further includes a transmitter 12 including a spoofer 18. The transmitter 12 includes a main channel 20 having a radar waveform generator 22 which generates radar signals in predetermined frequency slots or bands over an operating band, such as the X band, for coupling to a radar signal transmitter 24. The transmitter 24 amplifies the radar signals and couples the amplified signals 25 to a radar transmit antenna 26 for transmission of the radar signals in order to detect targets of interest.

The spoofer 18 includes a spoofer waveform generator 30 for generating spoofer signals capable of diverting or otherwise confusing smart sidelobe jammers from the actual radar signals transmitted by antenna 26. Stated differently, the spoofer signals are selected in order to effectively prevent smart sidelobe jammers from ascertaining the frequency of the radar signals 25. As one example, the spoofer signal has the same envelope as the radar signal 25 but different phase modulation over the entire operating band in the frequency slots or bands assigned to the radar signals 25, with an amplitude greater than the amplitude of the radar signal, at least in the sidelobes. The spoofer signal is coupled to a spoofer transmitter 32 for further coupling to, and transmission by a spoofer antenna 34. The spoofer signals are radiated in the direction of jammers. It will be appreciated by those of ordinary skill in the art that various transmitter and antenna configurations are possible for use with the transmitter 12 of FIG. 1.

The receiver 14 includes a receive antenna array 40 having a plurality N main beam subarrays 1 and associated electronics (including, for example, splitters, phase shifters, summing and difference circuits) for forming a sum beam pattern or signal Σ 42, a blanker beam pattern or signal BL 43, an azimuth difference pattern or signal ΔAz 44, an elevation difference pattern or signal ΔEl 46 and an optional difference/difference pattern or signal ΔΔ 48. Also provided in the antenna array 40 are a further plurality of n auxiliary antennas 1' provided for use with the sidelobe canceler 16. In the illustrative embodiment, the antenna array 40 is a planar array of solid state modules, having phase and amplitude control.

The blanker channel 13 includes a discrete blanker antenna 70 which, in the illustrative embodiment is provided in the form of a linear array. The signals from the array elements are summed by summer 72 to provide the blanker beam pattern or signal 43.

Each of the beam patterns or signals is coupled to a respective moving target indicator (MTI) circuit 76 for processing. Each MTI circuit includes a filter, such as a delay line filter, designed to reduce the effects of clutter. To this end, the time domain radar signal provided by the input beam patterns or signals is converted into a frequency domain signal and summed with a predetermined weight (which is a function of either known or modeled clutter frequencies and which are calculated from the estimation of covariance between the sidelobe canceler and other channels) in order to produce notches in the respective bandpass filter associated with each MTI circuit to modify the beam pattern in the passband. The resulting signals are then converted back into the time domain at the output of the respective MTI circuit 76.

Considering the sidelobe canceler 16, each of the n sidelobe canceler auxiliary antenna 1' is likewise coupled to an MTI circuit 76 of the type described above for processing. An adaptive weight circuit 80 is responsive to the signals received by the auxiliary antenna and modified by the respective MTI circuit 76 in order to determine a plurality of weights necessary to be introduced to each channel in order to null the sidelobes of the respective pattern. In the illustrative embodiment, the sidelobe canceler 16 provides sidelobe cancellation in the direction of jammers. Thus, at least one auxiliary antenna per jammer is necessary. The auxiliary antennas 1' are omnidirectional antennas.

Further signal processing in each channel is provided by a pulse compression circuit 82, a Doppler matched filter 84, and a threshold detection circuit 90, as is conventional. Note that the blanker and sum beam channels have identical matched filters.

Figure 2:
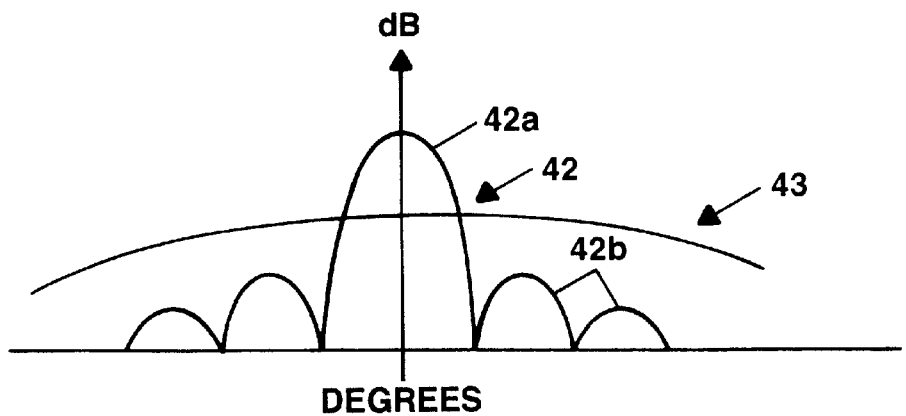
FIG. 2 shows an illustrative receive antenna pattern (the sum pattern) of the system of FIG. 1 and the blanker beam pattern.

Referring also to FIG. 2, the sum beam pattern 42 is shown in relation to the blanker beam pattern 43. The sum beam pattern includes a center beam 42a and a plurality of sidelobes 42b. As noted, the gain of the blanker beam 43 is greater than the gain of the main beam sidelobes 42b.

Since the input to the blanker channel is from an antenna 70 having higher gain than the main beam sidelobes in the angle region likely to cause interference signals, comparison of the output of the blanker and main beam channels by a comparison circuit 90 can be used to determine if a main beam detection is valid. More particularly, if detections in the main beam are stronger than detections in the blanker beam, then the main beam detections are determined to be valid (since excessive interference was not detected by the blanker). Alternatively, if detections in the blanker beam are stronger than detections in the main beam, then main beam detections are rejected as invalid due to excessive interference.

As noted above however, because of the high gain requirement of the blanker antenna 70, system noise levels are amplified which results in degradation of main beam sensitivity. As a result, a blanker of the type shown in FIG. 1 is typically disabled in the presence of strong sidelobe jamming.

Figure 3:
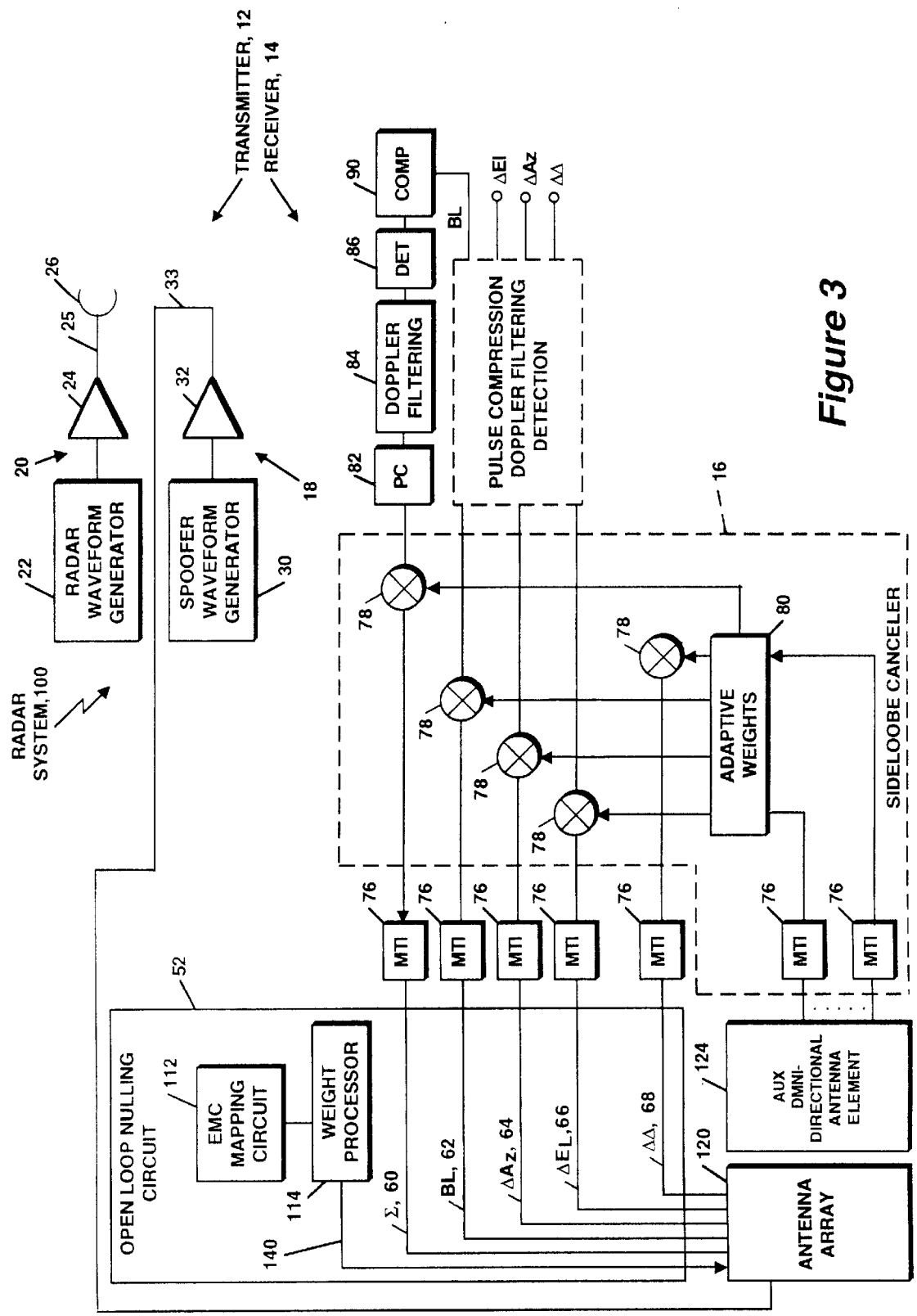
FIG. 3 shows a radar system including a blanker, a sidelobe canceler and a spoofer utilizing nulling in the jammer direction.

Referring to FIG. 3, in which like elements to FIG. 1 are referred to with like reference numbers, a solid state phased array radar system 100 according to the invention is shown to include a transmitter 104 and a receiver 106. The radar system 100 differs from the radar system of FIG. 1 in at least the following significant respects. First, a combined antenna array 120 is used for the blanker and spoofer functions as well as for the main beam and sidelobe canceler functions and, secondly, the radar system 100 includes open loop nulling in the direction of jammers in the main beam and blanker channels. In the illustrative embodiment, the combined antenna array 120 includes a pair of crossed linear arrays, as will be described below in conjunction with FIG. 6. Further in the illustrative embodiment, the open loop nulling is implemented by an open loop nulling circuit 52 including an ECM mapping circuit 112 and a weight processor 114.

The antenna array 120 includes a main beam aperture as well as a crossed linear array which is used for the blanker and spoofer functions described below in conjunction with FIG. 6. Thus, the spoofer transmitter 32, in response to a spoofer waveform generator 30, provides spoofer signals 33 to the antenna array 120 for transmission. Furthermore, the antenna array 120 includes electronics (including, for example, splitters, phase shifters, summing and difference circuits) for generating a sum beam pattern Σ 60, a blanker beam pattern BL 62, an azimuth difference pattern ΔAz 64, an elevation difference pattern ΔEl 66 and an optional difference/difference pattern ΔΔ 68.

More particularly, considering the open loop nulling circuit 52, the ECM mapping circuit 112 is operable to map the direction of jammers. This is achieved by scanning the array beam(s) along the region containing jammers and measuring and storing jammer locations. With the jammer direction information provided by the mapping circuit 112, the weight processor 114 calculates a plurality of weights 140 necessary for the antenna 120 to introduce a null in the direction of the jammers by adjusting phase/amplitude antenna module settings. Weights for each beam are calculated using optimum filter weighting theory to produce the desired null. Each of the resulting beam patterns thus has nulls in the directions of the jammers and may be referred to as nulled sum beam pattern Σ 60, nulled blanker beam pattern BL 62, nulled azimuth difference pattern ΔAz 64, nulled elevation difference pattern ΔEl 66 and nulled difference/difference pattern ΔΔ 68.

The auxiliary elements 124 are provided by n omnidirectional antenna elements, each of which is coupled to the sidelobe canceler 16. More particularly, each auxiliary element is coupled to a respective MTI circuit 76 of the sidelobe canceler 16, as shown.

Figure 4:
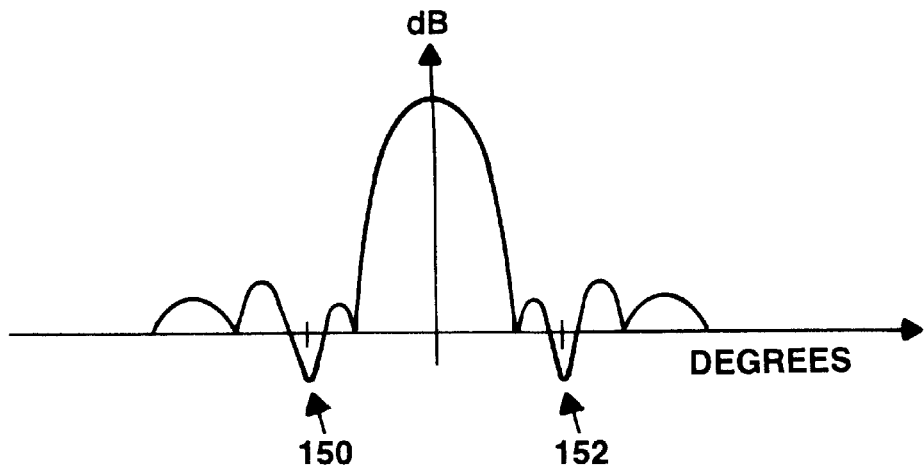
FIG. 4 shows the nulled sum beam pattern from the system of FIG. 3.

Referring also to FIG. 4, the nulled sum beam pattern 60 is shown having nulls in the two illustrated jammer directions 150, 152 while preserving blanker gain in other directions. With this arrangement, advantageously, the sum beam 60 is insensitive to the jamming energy in these directions.

Figure 5:
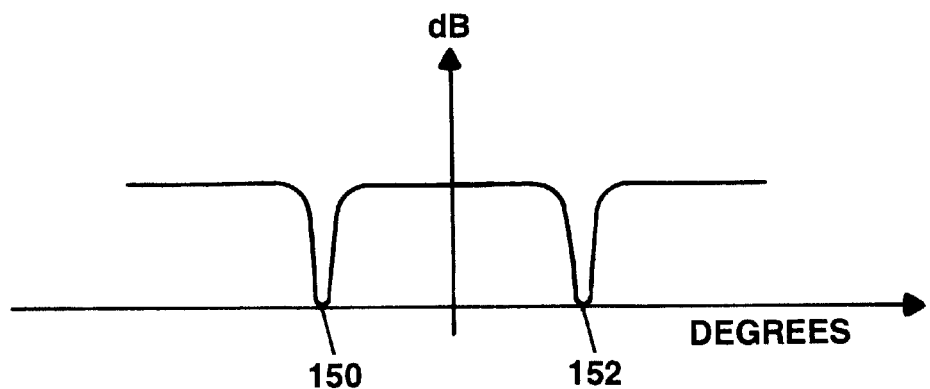
FIG. 5 shows the nulled blanker beam pattern from the system of FIG. 3.

Referring to FIG. 5, the nulled blanker beam pattern 62 is shown to have nulls at the same jammer directions 150, 152. With this arrangement, the blanker can be kept operational, even in the presence of strong sidelobe jamming.

It should now be appreciated that an advantage of the above-described open loop nulling technique is that certain drawbacks of the sidelobe canceler 16 are overcome. More particularly, the sidelobe canceler 16 makes up the additional jamming rejection. As a result of the above-described open loop nulling, the sidelobe auxiliary antenna 124, will have 21 dB more gain in the jamming direction than the blanker beam, rather than 14 dB less gain as would be the case in absence of open loop nulling in the jammer direction. More particularly, a single auxiliary element having 6 dB gain will produce +6 dBi–(–15 dBi)=21 dB more signal than the main beam. The attenuation (provided digitally in the signal processor) applied to the auxiliary channel will permit cancellation with less than 1 dB noise carryover loss. Also, with open loop nulling, the cancellation required is typically 20 dB less than for conventional systems, making the canceler system less susceptible to phase and amplitude unbalance between main and auxiliary channels.

The optional ΔΔ channel can be used to augment the open loop nulling described above. In particular, the ΔΔ output is the product of the ΔAz and ΔEl channels. The ΔΔ channel can be used as an additional auxiliary channel, to cancel one jammer. More particularly, the ΔΔ channel can be used to null either a sidelobe or a mainlobe jammer, and still permit normalized azimuth and elevation channels. This is because a normalized monopulse estimate is obtained from two beams (either ΔΔ and ΔAz or ΔΔ and ΔEl), both of which can be pointed at the jammer to null the jammer while producing an off-null target response. The modified angle channels (ΔEl', ΔAz', and ΔΔ') adapt the weights multiplying the sum channel to produce the closed loop null.

Figure 6:
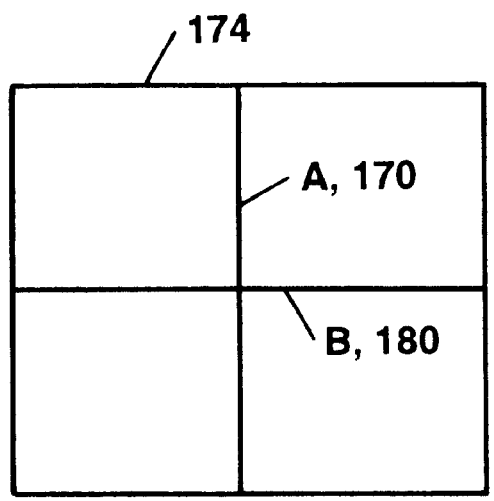
FIG. 6 shows a blanker/spoofer configuration for use with the system of FIG. 3.

Referring also to FIG. 6, a preferred configuration for providing the blanker and spoofer portion of the antenna array 120 is shown to include a pair of linear arrays 170, 180 disposed at right angles relative to one another. The antennas 170, 180 are orthogonal and thus provide a capability for introducing open loop nulls in the jammer directions while maintaining high gain elsewhere. The crossed linear arrays are an example of orthogonal antennas. It will be appreciated by those of ordinary skill in the art that other antenna configurations may be possible in order to achieve the open loop nulling and its advantages described herein and thus, are within the spirit and scope of the present invention.

The crossed linear arrays 170, 180 may be integral to the main antenna array aperture 174, as shown, or alternatively may be positioned outside of the main aperture. Advantages of providing the linear arrays integral to main aperture are less total aperture area and reduced multipath effects due to having identical phase centers for the main and blanker beams.

Beam 170 is omnidirectional in the u direction (azimuth) and directional in the v direction (elevation). In the illustrative embodiment, the beam covers on the order of 10 degrees in elevation, where most interference signals will be seen.

In the illustrative embodiment, the array 120 includes 10,000 elements, each assumed to have cosine gain dependence on scan angle. For the square antenna shown, each linear array 170, 180 has $\sqrt{10,000}=100$ elements with gain of 20 dBe (26 dBi). The beamwidth is $$\frac{\lambda}{100\frac{\lambda}{2}} = 20 \text{ mr}$$

so that about 10 beams will cover a 10 degree elevation swath. The gain of these beams is reduced from 20 dBe to 10 dBe, still 10 dB above an omni-directional sidelobe canceler auxiliary antenna. The element gain is given by:

$$G_e = 4 = 4\pi \frac{A_e}{\lambda^2}$$

For λ=0.03 m, $$A_e = \frac{\lambda^2}{\pi} = 3 \times 10^{-4} \text{ m}^2 \text{ per element,}$$

3 m² for the total aperture. Elements are assumed calibrated to a phase error of 4° rms so that the rms sidelobe level is $$v^2 = \sigma_\theta^2 + \sigma_\alpha^2 = 1.5 \times \sin^2 4 = -21 \text{ dBe} = -15 \text{ dBi.}$$

The beam 180 is omnidirectional in elevation (v) and directional in azimuth (u). In particular, beam 180 is used to point the beams of the horizontal linear array 180 in the azimuth direction of the jammers. When beams 170 and 180 are differenced and weighted by the antenna array 120, the resulting beam is omnidirectional in azimuth and has –15 dBi nulls in the direction of the jammers, as is illustrated by the nulled sum beam of FIG. 4.

Figure 7:
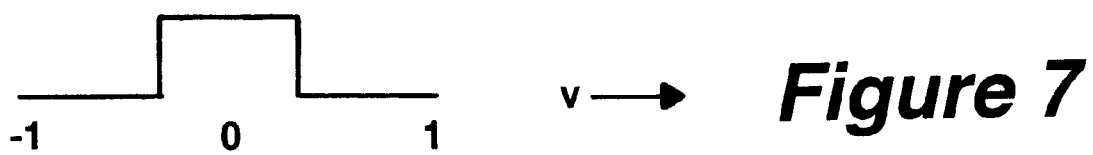
FIG. 7 illustrates the pattern of one of the crossed linear arrays of FIG. 6.
Figure 8:
FIG. 8 illustrates the pattern of the other one of the crossed linear arrays of FIG. 6.

Referring to FIG. 7, the pattern for the linear array 170 is shown with the x axis being the direction cosine for elevation. Referring to FIG. 8, the pattern for the linear array 180 is shown with the x axis being the direction cosine for azimuth.

Advantageously, the linear arrays 170, 180 are used for spoofer signal transmission and blanker signal receiving. This is possible because, with the open loop nulling on transmit, the seeker would be less likely to see the spoofer signal because of its lower power due to the nulls and therefore, it is possible to have the spoofer antenna be integral with the main transmit/receive antenna.

As shown in FIG. 1, a radar system 10 includes five SLC loops and blanker, elevation, azimuth, and main beams. For a system using pulse compression and MTI waveforms, the first processing step (post A/D converter) is the removal of clutter, using a 3–5 pulse canceler. Weights are calculated from the estimation of covariance between SLC and other channels. Pulse compression/Doppler filtering is followed by detection thresholding, with main beam detections reported only if they are stronger than the blanker channel.

It should be noted that the blanker channel is treated here as another beam, like the sum and difference channels. Thus, there is a need to provide sidelobe cancellation of jammers in the blanker channel, if blanking of sidelobe pulsed interference is preserved in the presence of sidelobe barrage jamming.

The difficulty stems from the need to have high blanker gain, while simultaneously requiring the SLC auxiliary antennas to have higher gain than the blanker.

The approach is shown in FIG. 6 which shows a pair of linear antennas A and B at right angles to each other. These may be outside the main antenna, but are shown integral to the main aperture in this example. Advantages include less total aperture area and reduced multipath effects by having identical phase centers for blanker and main beams.

Beams A and B double as spoofers on transmit and blankers on receive. Beam A is omni-directional in the u direction (azimuth) while directional in v to cover the horizon and elevations up to about 10 degrees, where most interference will be seen. For the square antenna shown, each linear array has $\sqrt{10,000}=100$ elements with gain 20 dBe (26 dBi). The beamwidth is $$\frac{\lambda}{100\frac{\lambda}{2}} = 20 \text{ mr}$$

so that about 10 beams will cover a 10 degree elevation swath. The gain of these beams is reduced from 20 dBe to 10 dBe, still 10 dB above an omni-directional SLC auxiliary antenna.

Beam B is omni-directional in the v (elevation) direction and is used to point beams in the azimuth direction of jammers. When A and B are differenced, the modified beam will be omni-directional in azimuth but will have −15 dBi nulls in the direction of jammers. Thus, the SLC auxiliaries will have 21 dB more gain in the jamming direction than the blanker beam, instead of 10 dB less. This allows the blanker to operate in sidelobe barrage jamming.

The concept described provides a method for providing near thermal noise limited performance for the radar in a sidelobe jamming environment, on both main and blanker beams. Most existing systems disable the blanker in barrage jamming. This concept is applicable to systems which require sidelobe blanking and jammer cancellation.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A radar system comprising:
   an antenna for receiving radar signals, said antenna comprising a main antenna having a main pattern and a blanker antenna having a blanker pattern;
   a beam forming network comprising a nulling circuit, said beam forming network being coupled to said main -antenna for forming a sum pattern having a null in the direction of a jammer and for forming a blanker pattern having a null in the direction of the jammed;
   a first signal processor for processing radar signals received in said sum pattern;
   a second signal processor for processing radar signals received in said blanker pattern; and
   a comparison circuit for comparing the level of signals received in said sum pattern with the level of signals received in said blanker pattern in order to determine when radar signals received in said main pattern are representative of a valid target.

2. The radar system of claim 1 further comprising an ECM map circuit coupled to said beam forming network for detecting the direction of the jammer, wherein the nulling circuit is responsive to the detected jammer direction for providing the null in the sum pattern and in the blanker pattern.

3. The radar system of claim 1 wherein said antenna further comprises a plurality of auxiliary antenna and said radar system further comprises a sidelobe canceler.

4. The radar system of claim 3 wherein said sidelobe canceler comprises:
   an adaptive weight circuit responsive to radar signals received by said auxiliary antenna for determining a plurality of sidelobe cancellation weights;
   a sum beam adder for adding one of said sidelobe cancellation weights to said radar signals received by said sum pattern; and
   a blanker adder for adding one of said sidelobe cancellation weights to said radar signals received by said blanker pattern.

5. The radar system of claim 3 wherein each of said plurality of auxiliary antenna is an omnidirectional antenna.

6. The radar system of claim 1 further comprising a transmitter comprising:
   a radar transmitter for transmitting a radar signal; and
   a spoofer for transmitting a spoofer signal that prevents a smart sidelobe jammer from detecting the frequency of the transmitted radar signal.

7. The radar system of claim 1 wherein said receive antenna comprises a pair of linear arrays disposed orthogonal with respect to one another.

8. A radar system of the type having a blanker for reducing the effects of sidelobe interference, said radar system comprising:
   a main beam channel having an antenna with a main pattern;
   a blanker having an antenna with a blanker pattern; and
   an open loop nulling circuit to provide a null in the blanker pattern and the main pattern in the direction of a jammer.

9. A radar system comprising:
   (a) a main beam channel comprising:
      (i) a main antenna; and
      (ii) a main beam processor coupled to the main antenna and responsive to radar signals received by the main antenna for detecting targets associated with said received radar signals;
   (b) a blanker for reducing the effects of sidelobe interference, said blanker comprising:
      (i) a blanker antenna; and
      (ii) a blanker processor coupled to the blanker antenna for processing radar signals received by the blanker antenna; and
   (c) a nulling circuit coupled to said main antenna and said blanker antenna for providing a null in each of the respective beam patterns in a direction of a jammer.

10. The radar system of claim 9 wherein the nulling circuit comprises:
    an ECM map circuit; and
    a beam steering processor.

11. The radar system of claim 9 further comprising a sidelobe canceler comprising:
    an auxiliary antenna;
    an adaptive weight circuit; and
    a summer circuit.

12. The radar system of claim 9 further comprising a spoofer.

13. A method of operating a radar system comprising the steps of:
    receiving radar signals using a main pattern and a blanker pattern;
    processing radar signals received in said sum pattern;
    processing radar signals received in said blanker pattern; and
    comparing the level of signals received in said sum pattern with the level of signals received in said blanker pattern in order to determine when radar signals received in said main pattern are representative of a valid target;
    detecting the direction of a jammer; and
    providing a null in the direction of the jammer in the sum beam pattern and providing a null in the direction of the jammer in the blanker beam pattern.

14. The method of operating a radar system as recited in claim 13 further comprising the steps of:
  determining a plurality of sidelobe cancellation weights;
  adding one of said sidelobe cancellation weights to said radar signals received by said sum pattern; and
  adding one of said sidelobe cancellation weights to said radar signals received by said blanker pattern.

15. The method of operating a radar system as recited in claim 13 further comprising the steps of:
  transmitting a radar signal; and
  transmitting a spoofer signal that prevents a smart sidelobe jammer from detecting the frequency of the transmitted radar signal.

16. A method of operating a radar system comprising the steps of:
  detecting targets associated with a received radar signal;
  reducing the effects of sidelobe interference using a blanker; and
  providing a null in a main pattern and a blanker pattern in a direction of a jammer.

17. A method of operating a radar system as recited in claim 16 comprising the step of providing a spoofer signal to mask a transmit signal.

* * * * *

UNITED STATES PATENT AND TRADEMARK OFFICE
CERTIFICATE OF CORRECTION

PATENT NO. : 6,538,597 B1
APPLICATION NO. : 09/503267
DATED : March 25, 2003
INVENTOR(S) : Steudel It is certified that error appears in the above-identified patent and that said Letters Patent is hereby corrected as shown below:

Column 1, line 54 delete "side lobe" and replace with --sidelobe--.

Column 2, line 2 delete "degrading, the" and replace with --degrading the--.

Column 5, line 65 delete

"$v^2 = \sigma_\theta^2 + \sigma_\alpha^2 = 1.5\sigma_\theta^2 = 1.5 x \sin^2 4 = -21\ dBe = -15\ dBi.$"

and replace with

--$\varepsilon^2 = \sigma_\theta^2 + \sigma_a^2 = 1.5\sigma_\theta^2 = 1.5 x \sin^2 4 = -21 dBe = -15 dBi.$--

Column 6 line 1 delete "$v^2$=fraction" and replace with "$\varepsilon^2$ = fraction--.

Column 6, line 40 delete "(ΔA and ΔAz or ΔΔ and ΔE1)," and replace with --(ΔΔ and ΔAz or ΔΔ and ΔE1),--.

Column 7, line 39 delete "ΔE1'ΔE1 − $c_{el}$ Σ " and replace with -- ΔE1' = ΔE1 − $c_{el}$ Σ --.

Column 7, line 57 delete "there channel" and replace with --the α channel--.

Column 7, line 63 delete "signal and jam a fractions" and replace --signal and jam a fraction--.

Column 7, line 66 delete "spoofer, signal" and replace with --spoofer signal--.

Column 8, line 9 delete "over come" and replace with --overcome--.

Column 8, line 26 delete "(Beam. A" and replace with --(Beam A--.

Column 8, line 29 delete "-5dBi" and replace with ---15dBi--.

Column 10, line 11 delete "radar system of FIG. 1" and replace with --radar system 10 of FIG. 1--.

UNITED STATES PATENT AND TRADEMARK OFFICE
CERTIFICATE OF CORRECTION

PATENT NO. : 6,538,597 B1
APPLICATION NO. : 09/503267
DATED : March 25, 2003
INVENTOR(S) : Steudel It is certified that error appears in the above-identified patent and that said Letters Patent is hereby corrected as shown below:

Column 12, line 14 delete

" $v^2 = \sigma_\theta^2 + \sigma_a^2 = 1.5 x \sin^2 4 = -21 dBe = -15 dBi.$ "

and replace with

-- $\varepsilon^2 = \sigma_\theta^2 + \sigma_a^2 = 1.5 \sigma_\theta^2 = 1.5 x \sin^2 4 = -21 dBe = -15 dBi.$ --

Column 13, line 39 delete "-antenna" and replace with --antenna--.

Column 13, line 41 delete "jammed;" and replace with --jammer;--.

Column 16, line 9 delete "the step of providing" and replace with --the step of: providing--.

Signed and Sealed this

Twenty-fourth Day of October, 2006

JON W. DUDAS
*Director of the United States Patent and Trademark Office*